United States Patent [19]
Erlandson

[11] Patent Number: 6,033,329
[45] Date of Patent: Mar. 7, 2000

[54] ADJUSTABLE-SLOPE TORQUE BRACKET

[76] Inventor: Richard K. Erlandson, 624 NE. Main, Lewistown, Mont. 59457

[21] Appl. No.: 09/099,191

[22] Filed: Jun. 17, 1998

[51] Int. Cl.⁷ ............................. F16H 59/00; F16H 55/56
[52] U.S. Cl. ................................................ 474/14; 474/43
[58] Field of Search .................................. 474/8, 11, 12, 474/13, 14, 43, 70

[56] References Cited

U.S. PATENT DOCUMENTS

| | | | |
|---|---|---|---|
| 3,800,608 | 4/1974 | Bessette | 474/14 |
| 3,986,406 | 10/1976 | Prasad | 474/14 |
| 4,575,363 | 3/1986 | Burgess et al. | 474/14 |
| 5,209,703 | 5/1993 | Mastine et al. | 474/14 |
| 5,326,330 | 7/1994 | Bostelmann | 474/13 |
| 5,597,060 | 1/1997 | Huddleston et al. | 474/14 |
| 5,647,810 | 7/1997 | Huddleston | 474/14 |
| 5,692,983 | 12/1997 | Bostelmann | 474/14 |
| 5,797,816 | 8/1998 | Bostelmann | 474/14 |

Primary Examiner—Tamara L. Graysay
Assistant Examiner—Matthew A. Kaness
Attorney, Agent, or Firm—Richard C. Conover

[57] ABSTRACT

An adjustable-slope torque bracket which includes an annular ramp support for holding multiple triangularly shaped camming ramps. The annular support includes a squared "U" shaped annular recess which opens in the direction of the axis of rotation of the annular support. Each of the triangular shaped camming ramps has a base portion which is shaped to fit within the annular recess. The base portion is raised slightly from the bottom of the recess and pinned between the inner and outer walls of the recess by an axle positioned adjacent one end of the base. The other end of the base is free to move relative to the bottom wall of the annular recess when the camming ramp pivots about the axle. An adjusting bolt is threadably inserted through the free end of the camming ramp and is of sufficient length to abut the bottom wall of the annular recess to raise or lower the free end of the base portion relative to the bottom wall of the annular recess. This adjusting bolt is used to adjust the slope of the camming ramp relative to the annular support ring.

4 Claims, 5 Drawing Sheets

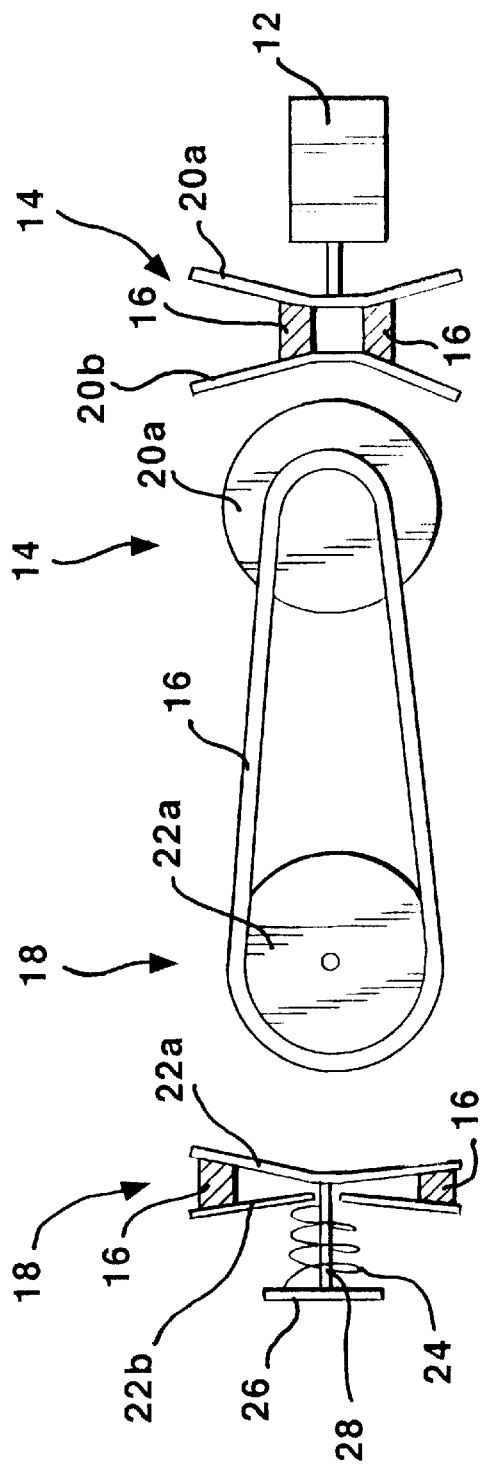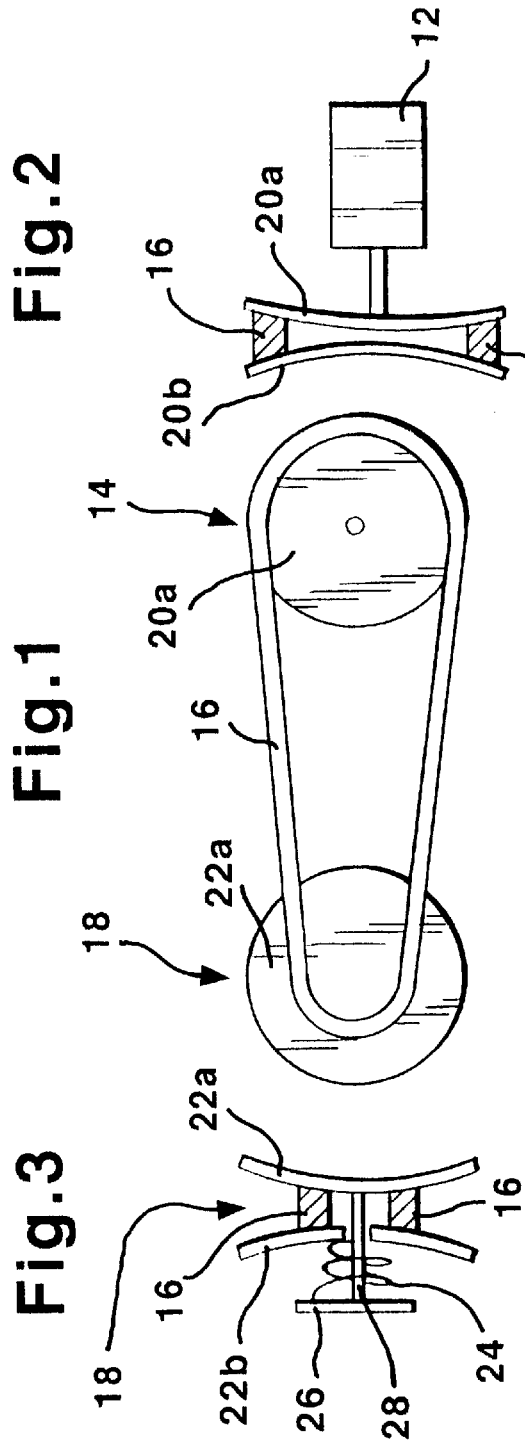

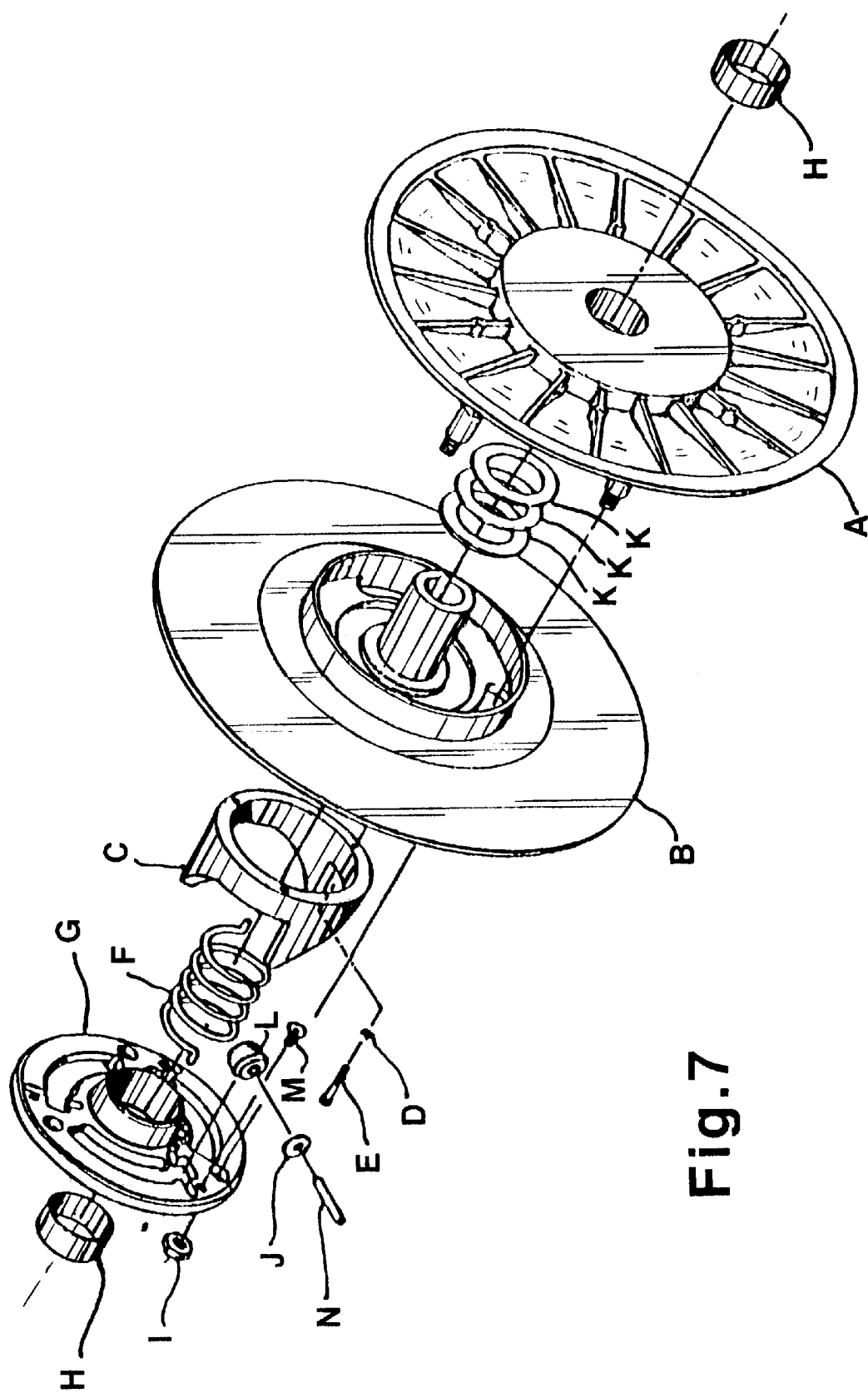

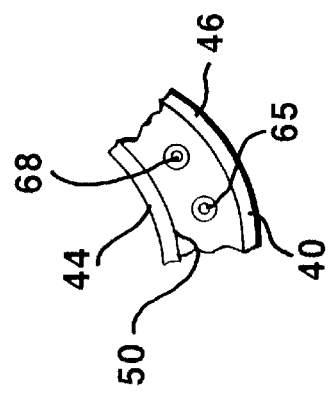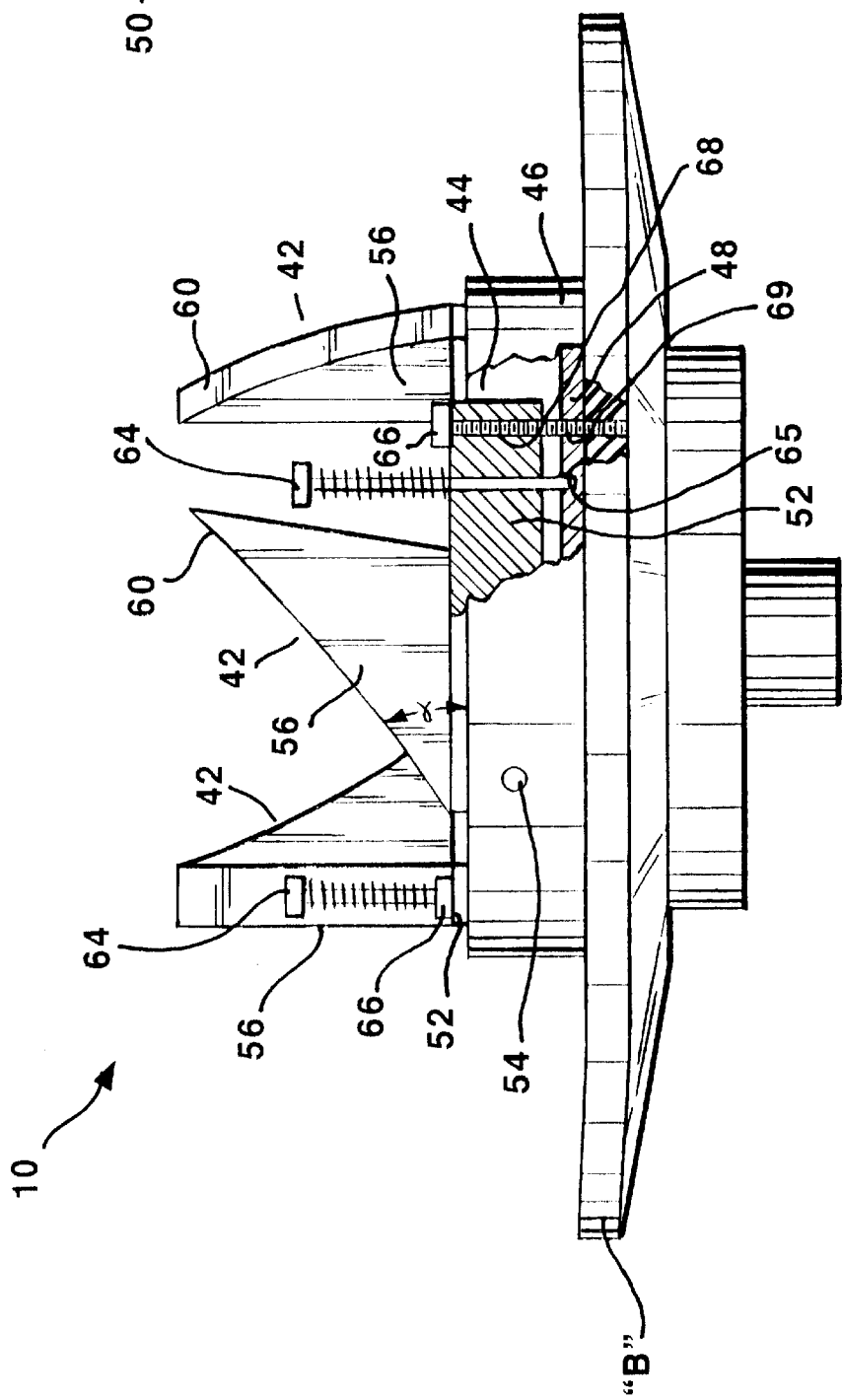

ADJUSTABLE-SLOPE TORQUE BRACKET

BACKGROUND OF THE INVENTION

Snowmobile drive trains often use a variable ratio pulley that has a belt running between two sheaves between which the separation can be controlled by sheave rotational speed. The driven clutch in a variable gear ratio drive train includes a torque bracket to regulate the force required to separate the sheaves. This concept is well-illustrated in U.S. Pat. No. 3,800,608 to Bessette. This patent illustrates cooperating ramps that cooperate to regulate the force required to separate the sheaves depending on the rotational speed of the engine. A problem exists with the Bessette structure, because the slope of these fixed ramps can not be changed to vary the functioning characteristics of the drive train.

Another patent, U.S. Pat. No. 5,209,703 to Mastine et al. illustrates a mechanism to change the slope of a ramp used in a variable ratio drive pulley, but this patent requires the removal of the existing clutch mechanism and replacing it with a new mechanism as shown in this patent. The mechanism shown in Mastine et al. will not work with triangular ramps similar to those shown in U.S. Pat. No. 3,800,608.

What is needed is a torque bracket used with a variable diameter V-belt driven clutch which torque bracket includes a mechanism for easily adjusting the slope of a triangularly shaped ramp to vary the functioning characteristics of the drive train. Further, a need exists for an adjustable-slope torque bracket which can be used to easily replace a torque bracket used in a conventional driven clutch.

SUMMARY OF INVENTION

The present invention is directed to an adjustable-slope torque bracket which may be used with a variable ratio driven clutch to vary the functioning characteristics of a drive train.

The adjustable-slope torque bracket of the present invention includes an annular ramp support for holding multiple triangularly shaped camming ramps. The annular support includes a squared "U" shaped annular recess which opens in the direction of the geometrical axis of rotation of the annular support.

Each of the triangular shaped camming ramps has a base portion which is shaped to fit within the annular recess. The base portion is raised slightly from the bottom of the recess and pinned between the inner and outer walls of the recess by an axle positioned adjacent one end of the base. The other end of the base is free to move relative to the bottom wall of the annular recess when the camming ramp pivots about the axle.

An adjusting bolt is threadably inserted through the free end of the camming ramp and is of sufficient length to abut the bottom wall of the annular recess to raise or lower the free end of the base portion relative to the bottom wall of the annular recess. This adjusting bolt is used to adjust the slope of the camming ramp relative to the annular support ring.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 1 is a schematic elevational view of a variable ratio pulley drive train at low engine RPM showing, only a single sheave of a driving clutch and a single sheave of a driven clutch and a V-belt running between the two sheaves;

FIG. 2 is a schematic right side view of FIG. 1 with background parts removed, showing both sheaves of the driving clutch;

FIG. 3 is a schematic left side view of FIG. 1 with background parts removed, showing both sheaves of the driven clutch;

FIG. 4 is a schematic elevational view of a variable ratio pulley drive train at high engine RPM showing only a single sheave of a driving clutch and a single sheave of a driven clutch and a V-belt running between the two sheaves;

FIG. 5 is a schematic right side view of FIG. 4 with background parts removed, showing both sheaves of the driving clutch;

FIG. 6 is a schematic left side view of FIG. 4 with background parts removed, showing both sheaves of the driven clutch;

FIG. 7 is a parts drawing taken from an ARCTIC CAT snowmobile parts catalogue identifying parts for a driven clutch assembly identified as "Assembly p/2 0726-068:"

FIG. 10 is an elevational view of an adjustable-slope torque bracket shown in FIG. 10 with parts broken away.

FIG. 11 is a plan view of a portion of an annular ramp support taken at the position of the breakaway shown in FIG. 10.

DESCRIPTION OF A PREFERRED EMBODIMENT

Figure 8:
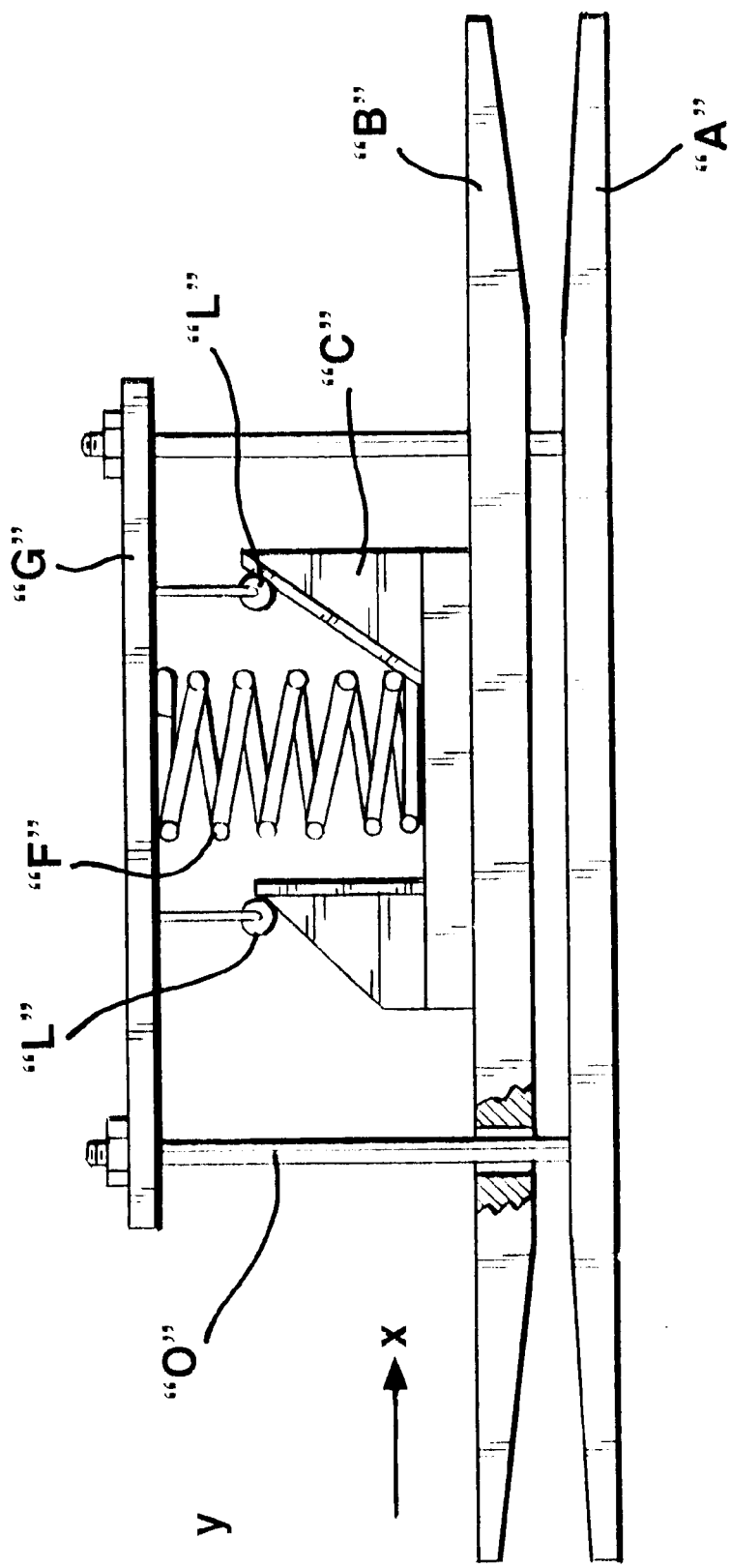
FIG. 8 is a schematic elevational view of an assembled ARCTIC CAT driven clutch assembly shown in FIG. 7 with parts removed.

In order to understand an adjustable-slope torque bracket 10 of the present invention, knowledge of a conventional variable ratio drive pulleys for a belt driven transmission is needed. FIGS. 1–6 are used to explain how a conventional variable ratio drive operates.

FIG. 1 illustrates a belt turning around a small diameter of a driving sheave and then turning around a larger diameter of a driven sheave, that is, a low gear ratio. For clarity, only one sheave, behind the belt, is shown in FIGS. 1 and 4 at each end of the belt. FIG. 4 illustrates the same belt turning around a large diameter of the same driving sheave and then turning around a smaller diameter of the same driven sheave, that is, a high gear ratio.

As best seen in FIGS. 1–3, a snowmobile engine 12, for example, drives a driving clutch assembly 14, which has driving sheaves 20a and 20b spring loaded toward each other to form a variable diameter V-belt pulley assembly. Driving clutch assembly 14 turns a flexible, but not stretchable, belt 16. At the other end of belt 16, the belt turns between driven sheaves 22a and 22b of driven clutch assembly 18. The driven clutch assembly 18 is connected to a snowmobile snow tread, for example, to enable a snowmobile operator to move across the snow.

At low RPM, driven clutch sheaves 22a and 22b are biased closely together by a spring 24, so that belt 16 rides around a large diameter portion of driven clutch 18 as best seen in FIGS. 1 and 3. This in turn forces driving clutch sheaves 20a and 20b far apart against a spring (not shown) that is biasing clutch sheaves 20a and b toward one another. At low RPM belt 16 passes around a small diameter portion of the driving clutch sheaves as best seen in FIGS. 1 and 2.

As best seen in FIG. 3, driven clutch sheaves 22a and 22b are biased together by a coiled spring 24. One end of coiled spring 24 is held by a plate 26, which has a bolt 28 attached between the right driven sheave 22a shown in FIG. 3 and plate 26. The other end of coiled spring 24 presses against the left driven sheave 22b shown in FIG. 3 thus biasing driven clutch sheaves 22a and 22b toward one another. Right driven sheave 22a and plate 26 are spaced apart the constant distance established by bolt 28 with spring-loaded and moveable sheave 22b positioned intermediate driven sheave 22a and plate 26.

As engine 12 RPM increases to about 9000 RPM, the gear ratio of the drive train changes to something approximated by FIGS. 4–6. In this high RPM position, belt 16 travels around a smaller diameter portion of driven clutch 18 as best seen in FIGS. 4 and 6. As illustrated, spring 24 is compressed (by centrifugal weights not shown) significantly more than at the low RPM position shown in FIG. 3. This compression moves sheaves 22a and 22b further apart to accommodate belt 16 near the small diameter portion of the sheaves.

At this high speed, belt 16 passes around a large diameter of driving clutch 14. Since belt 16 is basically non-stretchable, the belt is forced by the weak bias of the driving clutch sheaves to ride at a large diameter at the driving clutch. The gear ratio of the drive train has changed. A belt now turns around a large diameter driving pulley, which in turn is driving a small diameter driving pulley as shown in FIG. 4.

FIG. 7 is a page from an ARCTIC CAT Snowmobile catalog showing a conventional driven clutch assembly having a torque bracket similar to that used with the present invention. The parts shown in FIG. 7 are listed below:

| | |
|---|---|
| A | Movable Sheave |
| B | Stationary Sheave |
| C | Torque Bracket |
| D | Lock Washer |
| E | Socket Head Screw |
| F | Driven Spring |
| G | Roller Retainer Plate |
| H | Bearing |
| I | Lock Nut |
| J | Thrust - Plastic Roller Washer |
| K | Thrust: 0.030 in. Washer |
| L | Roller Bearing |
| M | Machine Screw |
| N | Roller Bearing Pin |
| O | Post |
| P | Bracket Mounting Bolt Holes |

Before discussing the present invention, one other conceptual idea must be understood. This concept relates to how the camming ramps control the amount of force exerted to compress the coiled spring. For this it is necessary to turn to FIG. 8 which shows a schematic view of an assembled ARCTIC CAT driven clutch shown in FIG. 7. Roller retainer plate "G" is biased apart from stationary sheave "B" with driven spring "F". Posts "O" extend through oversized slots in stationary sheave "B". Roller bearings "L" connected to roller retainer plate "G" roll along a hypotenuse of curved triangularly-shaped ramps of torque bracket "C".

A force, provided by conventional centrifugal weights during normal snowmobile operation is applied to roller retainer plate "G" in a direction perpendicular to the plane of plate "G". This force is transmitted down through roller "L" to the ramps of torque bracket "C". Because of the inclined ramp, this force is resolved into two forces. A y-component force acts to compress spring 24 and an x-component force acts to turn plate "G" and moveable sheave "A", which are bolted together, so that rollers "L" move down the ramp causing plate "G" and stationary sheave "B" to move closer together.

The angle of the ramp with respect to the stationary sheave "B" determines just how much of the applied force is used to compress spring 24. The greater the angle, the greater the portion of the applied force which may be used to compress spring 24. The conventional torque bracket shown in FIGS. 7 and 8 utilizes fixed angle ramps, and the portion of the applied force that may be used to compress spring 24 remains constant.

The present invention provides an adjustable slope torque bracket that replaces the fixed-angle torque bracket shown in FIGS. 7 and 8. Since the ramp angle may be adjusted, the amount of the applied force provided by the centrifugal weights that may be used to force sheaves 22a and 22b toward an open position may also be adjusted.

Figure 9:
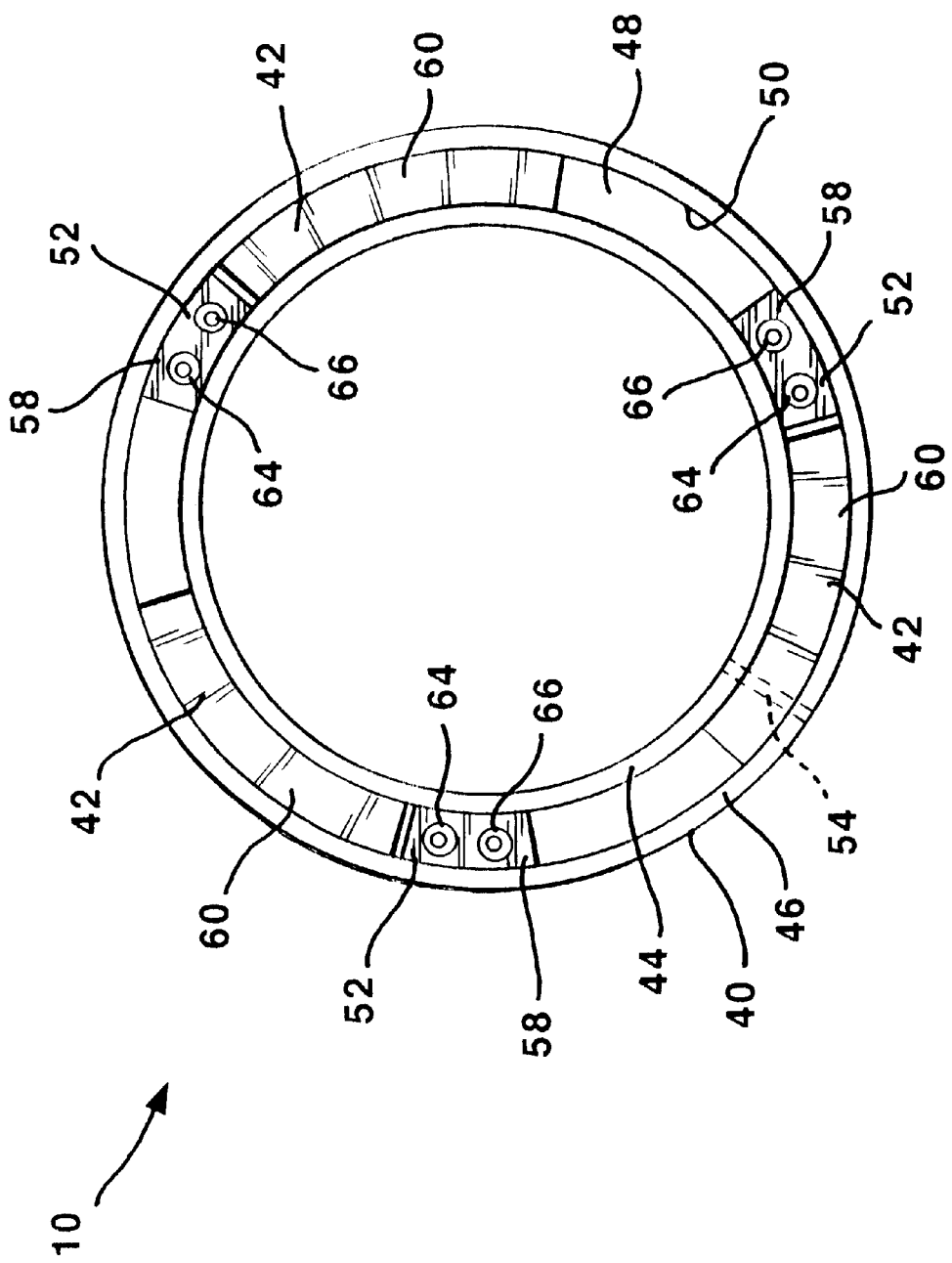
FIG. 9 is a plan view of an adjustable-slope torque bracket according to the present invention.

The adjustable-slope torque bracket 10 of the present invention is shown in FIGS. 9–11. An annular ramp support 40 is used to hold camming ramps 42. Support 40 includes a squared "U" shaped annular recess 50 having an inner wall 44 and an outer wall 46 spaced apart from each other as shown in FIG. 9. As best seen in FIG. 10, the annular recess includes a bottom wall 48 extending between inner wall 44 and outer wall 46.

Camming ramps 42 of the torque bracket 10 are shown in FIGS. 9 and 10. Ramps 42 include a triangular portion 56 and a base portion 52. The base 52 is sized to fit within recess groove 50. The base of each ramp 42 is pinned between inner wall 44 and outer wall 46 by an axle 54 located at an end of ramp 42 adjacent the intersection of the base portion and a hypotenuse portion of ramp 42, as shown in FIG. 10. The ramp 42 is positioned slightly above bottom wall 48 so that ramp 42 may pivot about axle 54. With this arrangement, the end of base 52 opposite the end supported by axle 54 is free to move, and can be raised away from bottom wall 48.

As seen in FIGS. 9 and 10, a portion 58 is forward on ramp 42 and extends beyond triangular portion 56, away from axle 54. A threaded hole 62 is provided in portion 58 as shown in FIG. 10 for receiving a spring-loaded adjusting bolt 64. Adjusting bolt 64 is used to adjust the angle of ramp 42 with respect to support 40 by pivoting ramp 42 with respect to axle 54. A ball 65, is provided in bottom wall 48 of support 40. Ball 65 is positioned so that bolt 64 will engage the ball as the bolt engages bottom wall 48. Ball 65 permits bolt 64 to be easily turned.

The portion 58 is further provided with a smoothbore hole 68 and the bottom wall 48 is provided with a smoothbore hole 69, corresponding with mounting bolt holes "P" shown in FIG. 7, axially aligned with hole 68. Once the desired ramp angle is obtained, a bolt 66, corresponding with bolt "E" shown in FIG. 7, is inserted through bores 68 and 69 with the head of bolt 66 located on top of portion 58. Bolt 66 is threadably received by sheave "A" in a conventional manner, and as shown in FIG. 7, to secure torque bracket 10 to sheave "A".

The torque bracket 10 of the present invention is substituted for the torque bracket "C" of FIG. 7. With torque bracket 10, the ramp angle of camming ramps 42 may be adjusted with bolts 64 to vary the functioning characteristics of the variable ratio drive train.

In operation, adjusting bolts 64 are threadably adjusted to provide a desired ramp angle. Then bolts 66 are tightened to secure triangular portion 56 at the desired ramp angle. Roller bearings "L" roll down and up the hypotenuse of camming ramp 42 as the engine is operating. As engine 12 speeds up, the force generated by the centrifugal weights is applied to the spring "F" through torque bracket 10. The portion of the total force that is used to compress spring "F" is determined by the slope of the camming ramp 42. If the ramp angle needs to be changed, adjusting bolts 64 and securing bolts 66 can be loosened and re-tightened to a new ramp angle setting. This changes the force required, at any given speed, to compress spring 24 which changes the diameter belt 16 turns around driven clutch 18 at the given speed. At this given speed, the gear ratio between driving clutch 14 and driven clutch 18 is changed accordingly.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. An adjustable-slope torque bracket for use with a driven clutch comprising:

an annular ramp support having a geometrical axis of rotation;

a camming ramp having a generally triangular shape with a hypotenuse forming a ramp and a base;

the camming ramp pivotally mounted to the ramp support at a position adjacent the intersection of the hypotenuse and the base, with the camming ramp extending outwardly from the ramp support in a direction parallel to the axis of rotation; and the camming ramp further including a portion opposite the end of the base pivotally mounted to the ramp support, having a threaded bore therethrough extending generally in a direction parallel to the axis of rotation; and an adjustable bolt threadably inserted in the threaded bore, sized to be extended beyond the camming ramp to engage the ramp support whereby the angle of the ramp with respect to the ramp support may be selected by turning the bolt.

2. The adjustable-slope torque bracket of claim 1 further including a securing bolt for securing the camming ramp to the support at a selected ramp angle.

3. The adjustable-slope torque bracket of claim 2 wherein the camming ramp has a squared "U" shaped annular groove opening in a direction parallel to the axis of rotation and wherein the base of the camming ramp is sized to fit within the cylindrical groove and wherein the camming ramp is pivotally mounted with an axle to the walls of the annular groove.

4. The adjustable-slope torque bracket of claim 3 further including a ball bearing mounted in the ramp support, at the point of contact of the adjusting bolt with the ramp support.

* * * * *